July 17, 1934. J. T. DALTON 1,967,202
PERFORATING MACHINE
Filed July 30, 1932 6 Sheets-Sheet 1

INVENTOR
JOHN T. DALTON
BY
ATTORNEY

July 17, 1934.                    J. T. DALTON                    1,967,202
                              PERFORATING MACHINE
                         Filed July 30, 1932        6 Sheets-Sheet 3

INVENTOR
JOHN T. DALTON
BY
ATTORNEY

July 17, 1934. J. T. DALTON 1,967,202
PERFORATING MACHINE
Filed July 30, 1932. 6 Sheets-Sheet 5

INVENTOR
JOHN T. DALTON
BY
ATTORNEY

July 17, 1934.  J. T. DALTON  1,967,202

PERFORATING MACHINE

Filed July 30, 1932   6 Sheets-Sheet 6

INVENTOR
JOHN T. DALTON
BY
ATTORNEY

Patented July 17, 1934

1,967,202

UNITED STATES PATENT OFFICE 1,967,202

PERFORATING MACHINE

John T. Dalton, Durham, N. C., assignor to Wright-Dalton Machinery Company, Durham, N. C., a corporation of North Carolina Application July 30, 1932, Serial No. 626,938

11 Claims. (Cl. 164—89)

The present invention relates to machines for perforating relatively thin material in the form of a strip, and more especially for perforating such material with a relatively large number of perforations to render it foraminous, and the primary object of the invention is to provide a machine of this kind which is capable of operating rapidly upon a continuous strip of the material while the latter is travelling continuously or without interruption through the machine.

Another object is to provide novel and improved punching or perforating mechanism for a machine of this character which is capable of registering successive perforations whereby regular or equidistant spacing of the perforations in the strip is accomplished.

Another object is to provide novel and improved means for feeding the strip evenly to the punching or perforating mechanism notwithstanding distortions which may occur in the strip, thereby insuring regularity and evenness in the perforations.

A further object of the invention is to provide novel and improved take-up means for winding the perforated strip into a roll, such take-up means being capable of compensating for the increase in the size of the roll as the winding of the strip progresses.

To these and other ends, the invention consists in certain improvements and combinations and arrangements of parts all as will be hereinafter more fully described, the features of novelty being pointed out particularly in the claims at the end of the specification.

In the accompanying drawings.

Similar parts are designated by the same reference characters in the different figures.

Perforating machines embodying the present invention are adapted to be used generally for perforating strips of relatively thin or light materials of various kinds such as paper, cloth or light or thin metals, and it is particularly adapted for use in perforating "Cellophane" or similar cellulose products in the form of thin flexible sheets obtained from viscose, the machine shown in the accompanying drawings and hereinafter described being capable of forming regularly spaced rows of numerous perforations in the strip of "Cellophane" or other material to render it foraminous and hence suitable for use in making containers for materials which require an envelope or receptacle of such character, as for example, tea bags. While the preferred embodiment of the invention is herein shown and described as applied to the making of a foraminous strip of material, it is to be understood that the invention is not restricted to the precise construction shown since equivalent constructions are contemplated and such will be included within the scope of the claims, and moreover, it will be apparent that the machine may be applied to other uses.

The machine as shown in the present instance comprises a suitable base in the form of legs 1 which provide a support for the machine and a frame comprising side members 2 which rest on the legs and are rigidly connected by transverse members 3, these side members providing a space between them for the mechanisms comprising the machine and serving as supports therefor. The side frame members are provided at one end with brackets 4 in which the cross rod 5 of a spool supporting frame 6 is adapted to rest, the upper end of the frame 6 being provided at each side with a slot or socket 7 in which the shaft 8 of a spindle or mandrel 9 is adapted to rest, this spindle or mandrel being adapted to support a spool 10 on which a roll 11 of the strip of "Cellophane" or other material is wound. The lower end of the frame 6 below its cross rod 5 is provided with a cross rod 12 which is adapted to abut against the respective end of the machine when the frame 6 is swung away from the machine or into dotted line position shown in Fig. 2 so that its upper end is rendered accessible for the removal of an empty spool and the placing of another spool of the material on the spindle or mandrel 9, the frame 6 and the roll of material 11 thereon being swung into full line position shown in Fig. 2 when the machine is in condition for operation.

Means is provided for feeding the strip of material continuously and at a uniform rate from the roll 11, such means according to the present invention comprising upper and lower feed rolls 13 and 14 which are mounted on driving shafts 15 and 16 having suitable bearing in the side members of the frame, these rolls being mounted adjacent to the position which the roll 11 occupies when in its operative position, the feed roll 13 being mounted vertically above the feed roll 14 and in such a position that the periphery of the roll of material 11 will rest against this roll and will remain in contact therewith during the unwinding of the strip from the roll 11, the diminishing diameter of the roll 11 as the strip is unwound therefrom being compensated for by swinging of the frame 6 inwardly or toward the feed rolls. The shafts 15 and 16 of the feed rolls are connected by gears 17 and 18 which cause these feed rolls to be driven in relatively opposite directions to feed the strip of material between them in a direction to draw the strip from the supply roll 11, these gears being so proportioned that the feed rolls will revolve with substantially equal surface speed.

The lower feed roll is preferably made in a plurality of sections in the form of disks 19 of rubber or similar yieldable material, each of these disks or roll sections being firmly clamped on the shaft 16 so as to be driven therefrom by a collar 20 which is fixed to the shaft 16 as by a set screw 20ª and by a collar 21 which is screw-threaded on the hub 20ᵇ of the collar 20. By this arrangement, the size of this feed roll or of any of the sections thereof may be increased by axially compressing the respective rubber disk or disks between the respective collars, or decreased by relaxing the axial pressure applied thereto by the respective collars. The upper feed roll 13 is preferably composed of two sections 22 and 23 with which pairs of the disks or roll sections 19 of the lower feed roll cooperate respectively, the roll sections 22 and 23 however being rotatably mounted on the respective feed roll shaft 15. By this arrangement, the sections of the upper and lower feed rolls will bear on the strip of material passing between them at opposite sides of its longitudinal center. In order to compensate for irregularities in the length of the longitudinal edges of the strip of material, due to distortion, warpage or other causes, and thereby insure regular feeding of the strip without sag or slack in either of its longitudinal edges, the sections 22 and 23 of the upper feed roll are driven from the shaft 15 through a differential or equalizing means, the differential driving means for these roll sections, as shown in the present instance, comprising a collar 24 which is rigidly fixed to the shaft 15 by any suitable means such as a set screw 25, this collar carrying bevel pinions 26 which are revolubly mounted thereon, and the inner ends of the feed roll sections 22 and 23 have bevel gears 27 and 28 fixed thereon and arranged to mesh with the bevel pinions 26. By this construction, the pinions 26 will be driven by the shaft 15 and the pinions will transmit equal power to the feed roll sections, enabling them to rotate at differential speeds according to variations in lengths of the strip at the respective sides of its longitudinal center.

The machine also comprises take-up means for winding the strip, after perforation thereof, into a roll. The take-up means, as shown, comprises uprights 29 fixed to the machine frame and having slots or sockets 30 in their upper ends to removably receive the shaft 31 of a take-up reel, this reel comprising a pair of collars 32 which are removably mounted on the shaft 31 and are fixed in proper spaced relation thereon by set screws 33. The inner ends of the collars 32 are formed with annular recesses 34 to receive the ends of a rewinding spool 35 to which the perforated strip may be attached in any suitable way and upon which it is rewound, the collars 32 being forced toward one another to firmly clamp the spool 35 between them and the collars being locked to the shaft 31 by the set screws 33. The spool 35 clamped between the collars 32 is rotated to wind the perforated strip thereon by a pair of flanges or disks 36 which are fixed by the screws 37 or in any other suitable manner to the respective collars 32, and the peripheries of these disks or flanges, which are circular, are provided with gear teeth 38. The disks or flanges 36 are rotated to wind the perforated strip by a pair of gear pinions 39, the teeth of which mesh with those on the peripheries of said flanges or disks, these pinions having faces sufficiently wide to allow for adjustments of the flanges 36 to accommodate spools of different lengths according to variations in the width of the strip being perforated in the machine.

Means is provided for driving the take-up device in a manner which will compensate automatically for the increasing diameter of the strip as the same winds upon the take-up spool 35. As shown, the driving pinions 39 for the take-up spool are rotatably mounted on a driving shaft 40 and they are frictionally driven by this shaft through friction disks 41 which are forced against the sides of the pinions by compression springs 42 which bear against them and encircle the shaft 40, the power of these springs being varied as desired to insure the proper amount of tension on the perforated strip by collars 43 against which the inner ends of the springs rest, these collars being adjustable axially on the shaft 40 and fixed in adjusted positions thereon by set screws 44.

Figure 2:
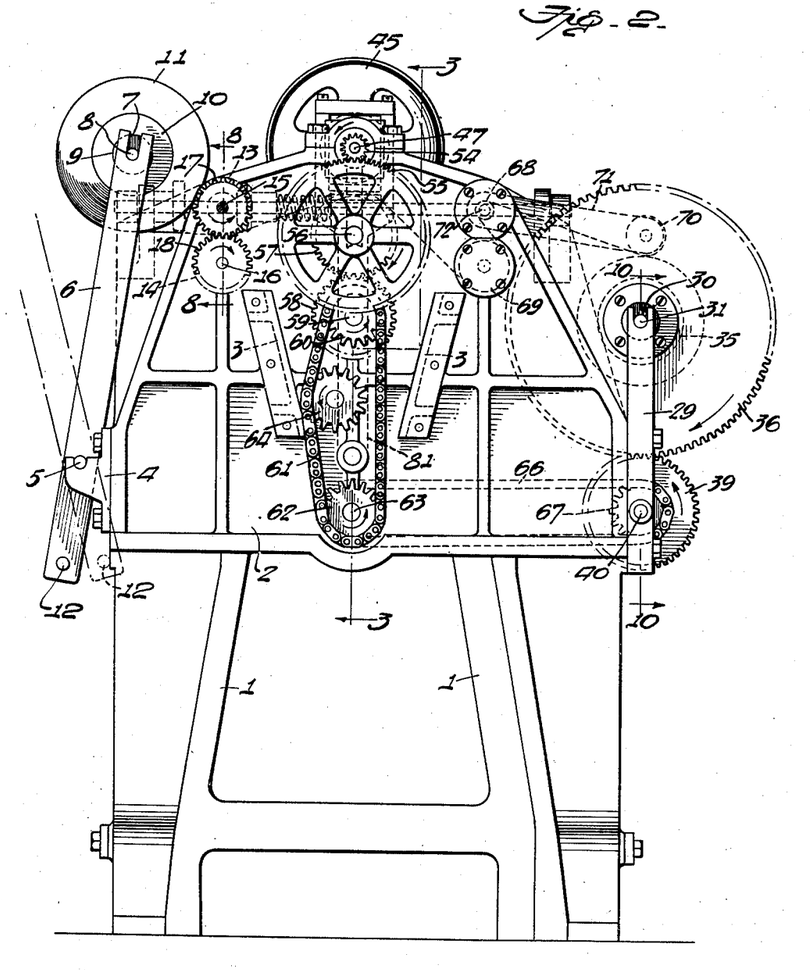
Fig. 2 is a side elevation of the machine shown in Fig. 1 as viewed from the lower side thereof.
Figure 3:
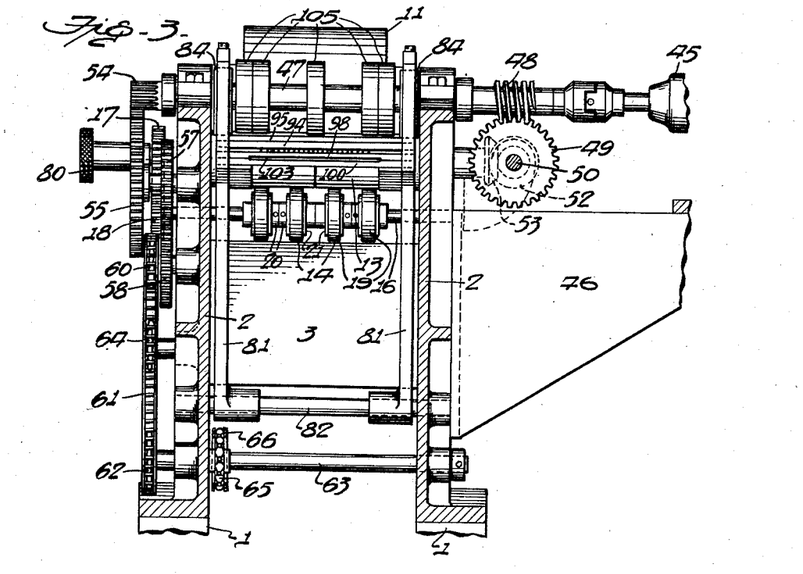
Fig. 3 is a transverse vertical section through the machine, taken on the line 3—3 of Fig. 2.

The feed rolls and take-up mechanism described are driven from any suitable source of power, preferably an electric motor 45 which may be mounted on a bracket 46 extending rigidly from one side of the machine frame, the shaft of the motor in the present instance being coupled directly to a shaft 47 having suitable bearings in the side frame members of the machine, this shaft having a worm 48 fixed thereon and meshing with a worm wheel 49, the latter being fixed on a shaft 50 journalled in bearings 51 at one side of the machine. The shaft 50 drives a bevel gear 52 which meshes with a bevel gear 53 fixed on one of the feed roll shafts, the shaft 15 of the upper feed roll in the present instance, the other or lower feed roll being driven through the connecting gears 17 and 18. The shaft 47 has a pinion 54 fixed thereon, this pinion meshing with a larger gear 55 rotatably mounted on a stub shaft 56, the gear 55 having another smaller gear 57 connected thereto to rotate therewith and the gear 57 meshing with a gear 58 mounted on a stub shaft 59. The gear 58 has a sprocket wheel 60 connected thereto to rotate therewith and a sprocket chain 61 connects the gear 60 to a sprocket wheel 62 mounted on a shaft 63, an idler sprocket wheel 64 being provided for tensioning the sprocket chain. The shaft 63 to which the sprocket wheel 62 is fixed has a sprocket wheel 65 fixed thereon, and this sprocket wheel drives a chain 66 which in turn drives a sprocket wheel 67 fixed on the shaft 40, the gearing being so proportioned that the rewinding spool 35 will be rotated at a speed which will insure winding of the perforated strip as rapidly as the strip is fed by the feed rolls when the rewinding roll is of the smallest diameter and the frictional drive of the rewinding spool from the shaft 40 allowing slippage in the drive to take place and thereby compensate for the increasing diameter of the roll as the winding of the strip progresses. In order to insure the winding of the strip evenly and with the requisite tension on the spool 35, a pair of tensioning rolls 68 and 69 are provided adjacent to the spool 35, the strip of material passing beneath the roll 69 and over the roll 68 as shown in Fig. 2, and a weight roll 70 is also preferably provided which is arranged to rest on the roll of material as it winds on the spool 35, this weight roll being rotatably mounted between a pair of arms 71 which swing downwardly by gravity from the shaft 72 of the roll 68, the arms 71 being loose on the shaft 72 so that the axis of the weight roller 70 will always maintain a true horizontal position or a position parallel with the axis of the rewinding spool 35, the shaft 72 being rotatably mounted in bearings in the side members of the frame.

Figure 1:
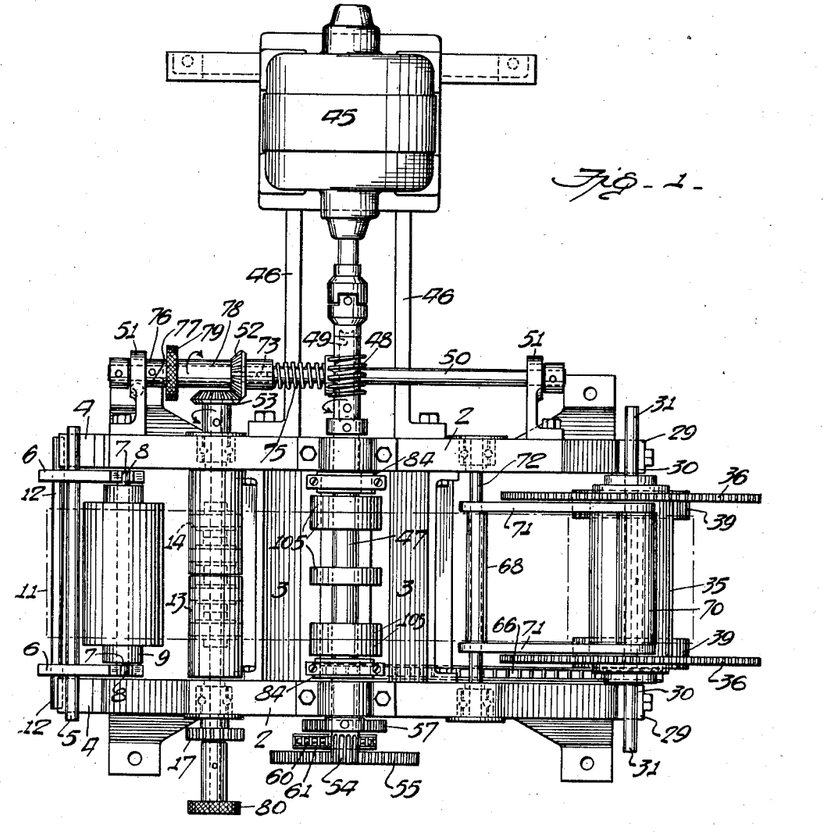
Fig. 1 is a top plan view of a perforating machine constructed in accordance with the present invention.
Figure 4:
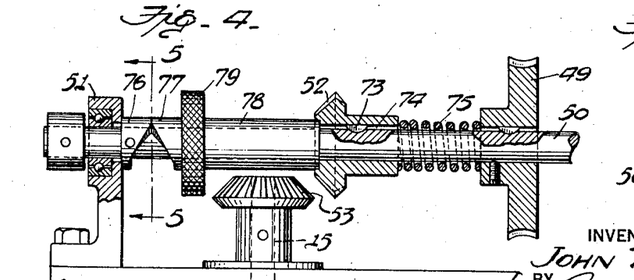
Fig. 4 is a detail view, on an enlarged scale and partly in section, of a throw-off device for the feed rolls.
Figure 5:
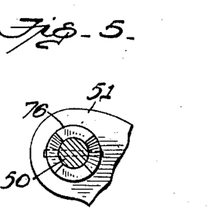
Fig. 5 is a transverse section taken on the line 5—5 of Fig. 4.
Figure 6:
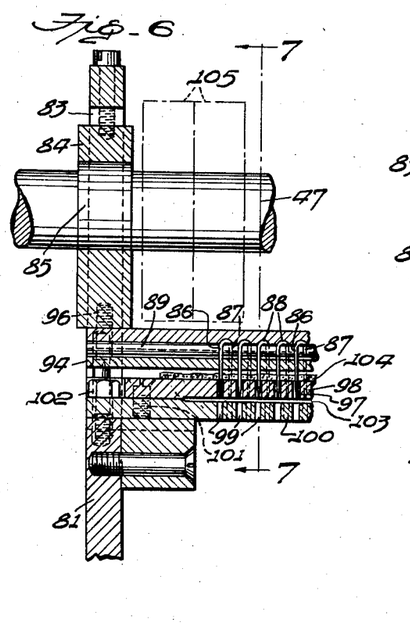
Fig. 6 is a transverse vertical section, on an enlarged scale, of a portion of the perforating mechanism and its driving means.
Figure 7:
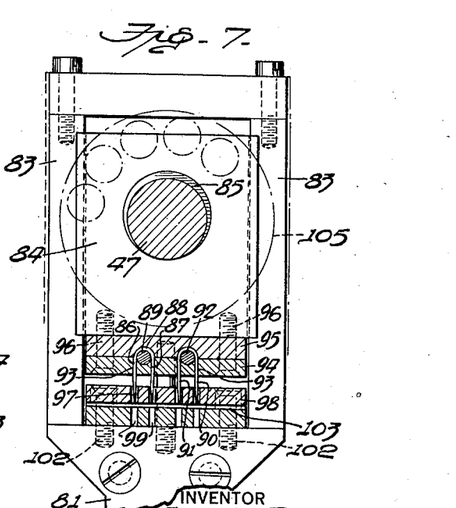
Fig. 7 is a vertical section taken on the line 7—7 of Fig. 6.
Figure 8:
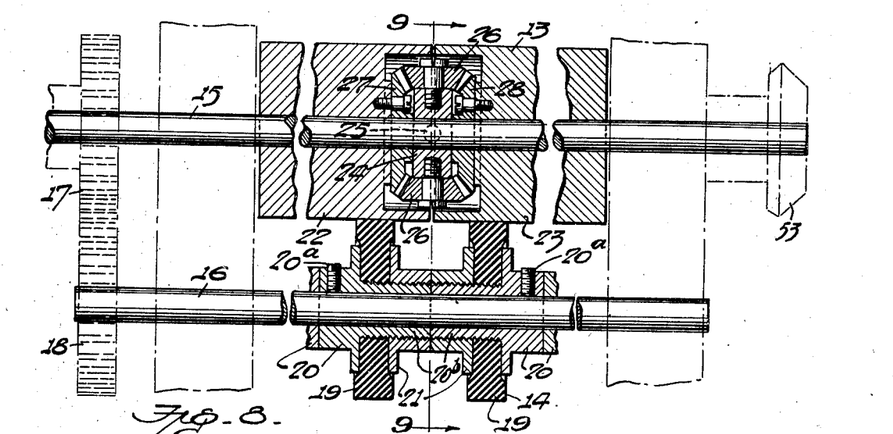
Fig. 8 is a vertical section, on an enlarged scale, through the feed rolls, taken on the line 8—8 of Fig. 2.
Figures 9, 10:
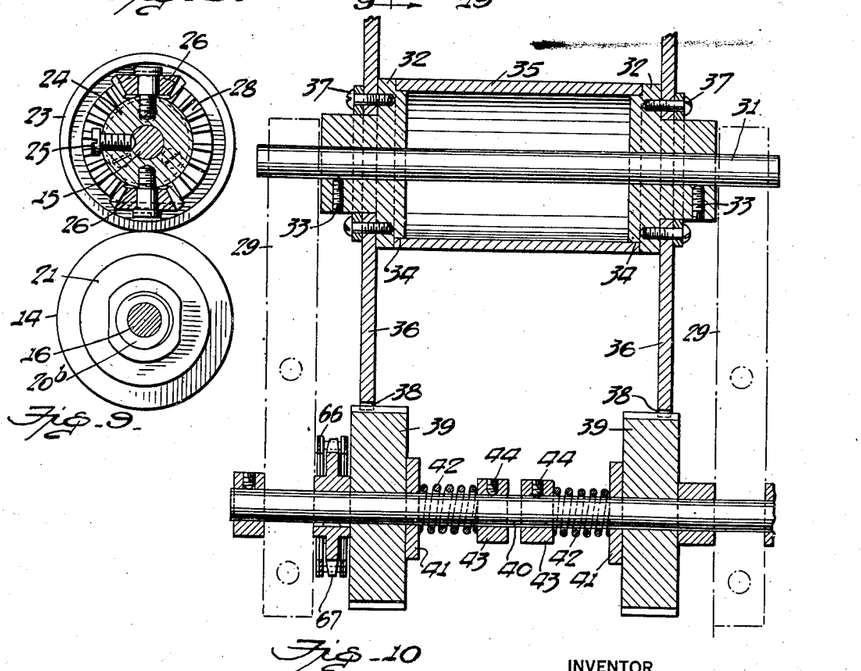
Fig. 9 is a section taken on the line 9—9 of Fig. 8.
Fig. 10 is a section through the take-up means, this section being on an enlarged scale and taken on the line 10—10 of Fig. 2.

In order to enable the feed rolls 13 and 14 to be disconnected from their driving means and thus rendered freely rotatable manually to facilitate the threading of a new strip of material through the machine or for other purposes, the bevel gear 52 on the shaft 50 which drives the feed rolls through the bevel gear 53 is splined on the shaft 50 by a key 73 fixed in said shaft and operating in a key-way 74 in the hub of the gear 52 so that the latter is connected by the key and key-way so that it will be driven by the shaft 50 but is shiftable axially on said shaft to engage and disengage it from the gear 53. The gear 52 is urged toward a position to mesh with the gear 53 by a spring 75 interposed between the gear 52 and the worm wheel 49, and a pair of complemental cams 76 and 77 are provided for forcing the gear 52 out of mesh with the gear 53 against the action of the spring 75 and for holding the gear 52 in such inoperative or non-driving position. The cam member 76 is pinned or otherwise fixed to the shaft 50 and the cam member 77 is formed on a sleeve 78 which is rotatably and slidably mounted on the shaft 50 and bears against the side of the gear 52 opposite to that side engaged by the spring 75, and the sleeve 78 is provided with a knurled flange 79 or other means by which the operator may manually rotate the sleeve 78 on the shaft 50. The opposing faces of the cam members 76 and 77 have raised and depressed portions which are held in contact under the action of the spring 75. When the sleeve 78 is rotated into the position shown in Fig. 1, the raised portion of one cam member fits into the depressed portion of the other cam member and the gear 52 is then in driving relation with the gear 53 for the feed rolls and the gear 52 is held in such driving position by the spring 75, this being the normal position of the gear 52 while the machine is in operation. When it is desired to disconnect the feed rolls from their driving means, as when placing a fresh roll of material into the machine, the sleeve 78 is rotated by means of the milled flange 79 so as to bring the raised portions of the cam members 76 and 77 in directly opposite relationship as shown in Fig. 4 and such rotation of the sleeve 78 will cause it to be shifted axially in a direction to force the gear 52 out of mesh with the gear 53 against the action of the spring 75 and to hold it in such inoperative or non-driving position. The feed rolls 13 and 14 are then free for rotation to feed the strip between them and they may be rotated manually by a milled head or collar 80 which may be fixed on the shaft of one of the feed rolls for this purpose. Rotation of the sleeve 78 to restore the raised portion of each cam member to a position opposite to the depressed portion of the other cam member, as shown in Fig. 1, will restore the gear 52 to driving relation with the gear 53.

The punching or perforating mechanism provided by the present invention is located in the machine to operate upon the portion of the strip which lies between the feed rolls 13 and 14 and the tension rolls 68 and 69. The punching or perforating mechanism comprises a pair of arms 81 which are pivoted at their lower ends on a shaft 82, the ends of this shaft being mounted in suitable sockets in the side members 2 of the frame preferably directly beneath the shaft 47. The upper ends of the arms 81 are each provided with substantially vertical guides 83, and the block or cross head 84 is fitted to reciprocate vertically in such guides. The shaft 47 has a pair of eccentrics 85 fixed thereon, these eccentrics being set at the same angle on the shaft and being fitted to rotate in the respective blocks or cross heads 84, the latter being carried by these eccentrics and being caused to oscillate or travel in circular paths during rotation of the eccentrics by the shaft 47, so that the blocks or cross heads 84 will reciprocate substantially vertically in the guides 83 of the arms 81 and will also cause the arms 81 to swing to and fro substantially in the direction of the length of the strip of material.

The blocks or cross heads 84 carry the punching or perforating devices which, as shown, comprise a suitable number of rows of punches or perforating pins. Preferably, four rows of punches or perforating pins having the punches or pins in staggered relationship are employed, the punches or pins in two of the rows, as 86 and 87, being formed by the ends of yoke-shaped wires or members 88, the middle bends of which straddle a supporting rod 89, and the punches or perforating pins of the other two rows 90 and 91 being formed of similar yoke-shaped wires or members the middle bends of which straddle a supporting rod 92. The ends of the yoke-shaped wires or members forming the punches or perforating pins extend downwardly through apertures 93 formed in a plate 94, the upper side of which is recessed to receive the supporting rods 89 and 92, and these supporting rods and the intermediately bent portions of the yoke-shaped wires or members forming the punches are firmly clamped between the plate 94 and an upper plate 95, the lower side of the latter plate being suitably recessed to accommodate the supporting rods 89 and 92 and the intermediately bent portions of the yoke-shaped punch forming wires.

Figure 11:
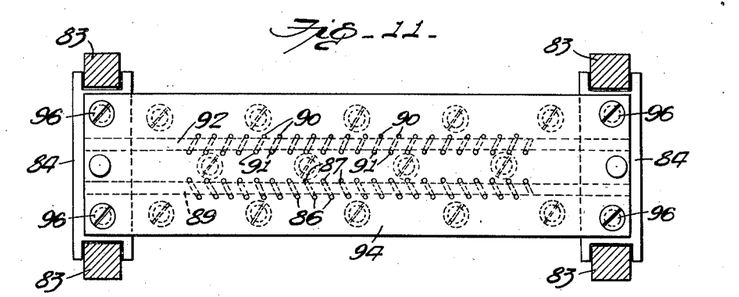
Fig. 11 is a top plan view of the punching or perforating mechanism.
Figure 12:
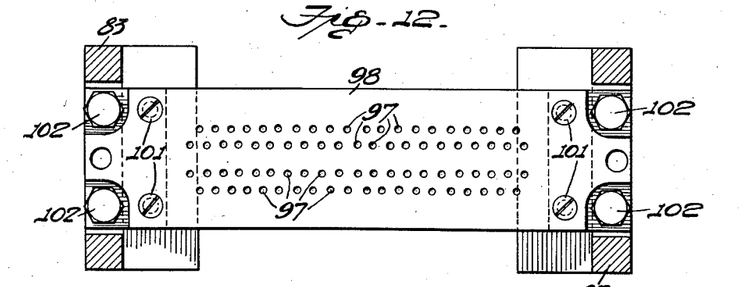
Fig. 12 is a top plan view of the perforating die and cooperative guide plate for the punches or perforating pins.

The plates 94 and 95 and the punches or pins carried thereby are secured by screws 96 or other suitable means to the lower edges of the blocks or cross heads 84, so that the punches or perforating pins will be reciprocated in the guides 83 of the arms 81 and will also swing laterally with said arms in the manner already described respecting the motion of the blocks or cross heads 84. The lower or operative ends of the punches or perforating pins operate vertically through guiding apertures 97 formed in a stripper plate 98 which underlies the plate 94, and the lower or free ends of the punches or perforating pins are movable, by the eccentrics 85, into and out of registering apertures 99 formed in a die plate 100 which underlies the stripper plate 98. The stripper plate 98 and die plate 100 are firmly secured together in registering relationship by screws 101, and these two plates are rigidly secured at their ends to the respective swinging arms 81 by screws 102. A slot or recess 103 is formed between the opposing faces of the plates 98 and 100, as by shouldering the ends of these plates, to provide a passageway between them for the strip to be perforated. A strip of felt or other suitable material 104 is preferably interposed between the lower punch supporting plate 94 and the top of the stripper plate 98 and through which the punches or perforating pins operate, for the purpose of maintaining the punches in a clean condition and free of accumulations of material punched from this strip. In using four rows of punches or perforating pins as shown, the rows of punches or pins are preferably arranged in parallelism and the outer rows 86 and 90 are spaced equidistantly from the inner rows 87 and 91 respectively while the inner rows 87 and 91 are spaced apart a distance equal to one and one half times the spacing of the outer rows therefrom, and when it is desired to produce perforations in the strip which are spaced equidistantly longitudinally and transversely thereof, the punches in each row are spaced apart a distance equal to the spacing of the outer rows of punches from the respective inner rows thereof, as shown, and the punches or pins in the inner rows 87 and 91 are directly opposite to one another while those in the outer rows 86 and 90 are opposite to one another but staggered relatively to the punches or pins in the inner rows so that the punches or pins in the outer rows lie opposite to points midway of the spaces between the punches or pins in the middle rows, as shown clearly in Fig. 11, and of course the apertures in the stripper plate 98 and in the die plate 100 will occupy corresponding relative positions. The extent of throw of the eccentrics 85 and the ratio of gearing between the shaft 47 carrying these eccentrics and the feed rolls 13 and 14 are such that during each revolution of the shaft 47, the punches or perforating pins will be moved in a circular path which will lower the punches into cooperation with the die plate and thereby perforate the portion of the strip lying between the die plate and the stripper plate, the punches while in perforating engagement with the strip will travel therewith at the same speed at which the strip is being fed by the feed rolls, the punches or perforating pins will be raised out of engagement with the strip while the punches and strip are advancing at the same speed and then returned to a position to form subsequent perforations in the strip which are spaced along the strip a distance equal to the spacing of the outer rows of punches from the inner rows thereof and two-thirds of the spacing between the inner rows of punches, so that the perforations formed in the strip will be in rows spaced longitudinally thereof one-half the distance apart as compared with the spacing of the outer rows of punches from the inner rows thereof, and some of the perforations made by each subsequent punching operation will align with and intervene perforations in previously punched rows while other perforations made by such subsequent punching operation will be in a row between rows of previously made perforations, with the result that the perforations in the finished perforated strip, as that designated X in Fig. 22, will be substantially twice as numerous as the punches in the rows, in the transverse dimension of the strip, and the rows of perforations in the strip will be spaced longitudinally thereof a distance equal to one-half the spacing of the outer rows of punches from the inner rows thereof, as will be apparent from a comparison of the strip shown in Fig. 22 with the punch means shown in Fig. 11.

If, for example, the outer rows of punches 86 and 90 are spaced from the respectively adjacent inner rows 87 and 91 a distance of two-tenths of an inch and the inner rows of punches 87 and 91 are spaced apart a distance of three-tenths of an inch and the punches in each row are staggered as described and spaced apart two-tenths of an inch, and the strip and the punches advance a distance of one-tenth of an inch during each punching operation and the strip advances another one-tenth of an inch during the return motion of the punches for the same distance preparatory to the next punching operation, the perforations produced in the strip will be uniformly spaced apart a distance of one-tenth of an inch, both longitudinally and transversely of the strip.

The operation of a perforating machine constructed as hereinbefore described is as follows:—

Figure 13:
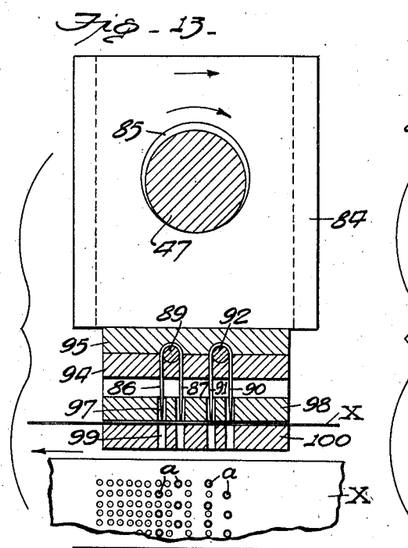
Figs. 13, 14, 15 and 16 are collective views of the punching or perforating mechanism and of the strip, showing diagrammatically the successive steps in the punching of each set of perforations.
Figure 14:
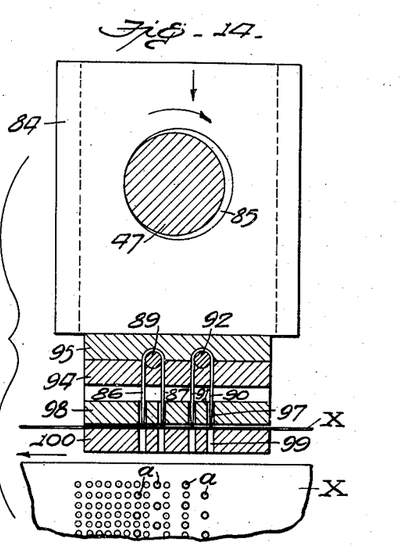
Figure 15:
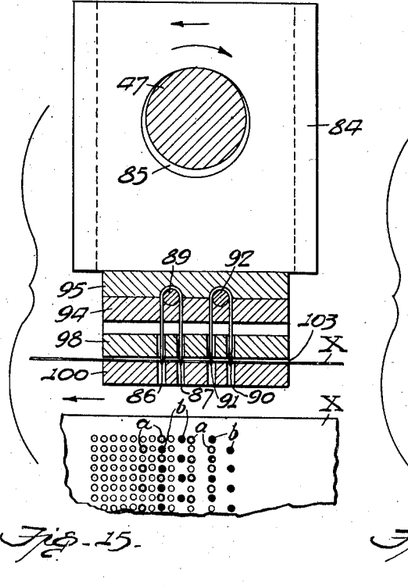
Figure 16:
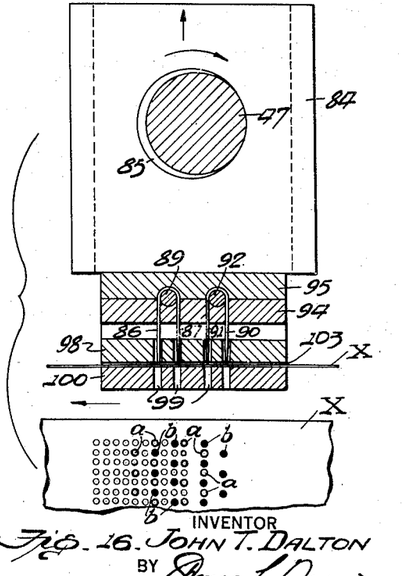
Figures 17, 18, 21:
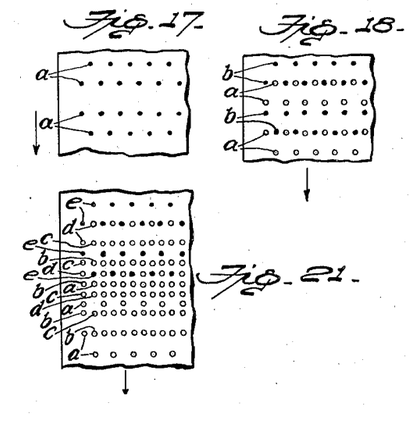
Figs. 17, 18, 19, 20 and 21 each shows a portion of the strip after it has received successive perforations.
Figures 19, 20:
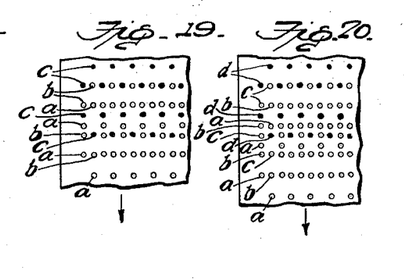

Assuming a supply roll 11 of the material to be perforated is mounted in the frame 6 and is extended between the feed rolls 13 and 14, then through the passageway 103 between the stripper plate 98 and the die plate 100 and its end is passed beneath the tension roller 69 and over the tension roller 68 and is attached to the winding spool 35 and that the motor 45 is in operation and the gear 52 is in mesh with the feed roll driving gear 53, the feed rolls 13 and 14 will be driven continuously in the directions indicated by the arrows in Fig. 2 to feed the strip continuously between them to the punching or perforating mechanism at a constant rate equal to the forward travel of the punches and cooperative die plate, and the pinions 39 will be frictionally driven by overmotion of the shaft 40 through the connections hereinbefore described to rotate the spool 35 in a direction to draw the strip past the tension rollers and to continuously wind it upon the spool 35. While the strip is being thus continuously fed from the supply roll and wound upon the spool 35, the eccentrics 85 rotate continuously in a direction which carries the punches downwardly into and through the strip, then advances the punches with the travelling strip through a distance equal to one-half the spacing between the outer and inner rows of punches or, for example, one-tenth of an inch, and at the same speed at which the strip travels, then raises the punches to withdraw them from the strip while the punches and strip are travelling at the same speed so that the strip will not be torn by the punches, and, while the punches are thus withdrawn from the strip, they are shifted rearwardly or in a direction opposite to that in which the strip is travelling, for a distance equal to one-half the spacing between the inner and outer rows of punches, or, for example, one-tenth of an inch, preparatory to the next descent of the punches to perform the next following punching operation, while the strip continues to advance a further distance equal to one-half the spacing between the outer and inner rows of punches or, for example, a further one-tenth of an inch. Fig. 13 shows the punches while midway of their rearward or return motion after withdrawing from the travelling strip X. Fig. 14 shows the punches after reaching the limit of their rearward motion and while descending to again perforate the strip. In Figs. 13, 14 and 17, a represents the perforations made in the sheet by a previous punching operation, the continued advance of the strip during the return motion of the punches being shown in Fig. 14. Fig. 15 shows the punches at the mid-point in their travel with the advancing strip and in punching relation therewith, the punches all making the new perforations b in the strip, two of the rows of which aline with but intervene the perforations a in the rows previously made in the strip, another row of these new perforations b being made in the strip two-thirds of the distance across the space between the rows of perforations a made by the more widely spaced inner rows of punches, and another row of the new perforations b being made in advance of the perforations, as shown in Fig. 18. Fig. 16 shows the punches at the end of their advance in the direction of feed of the strip and withdrawn therefrom. The next following operation of the punches on the strip will take place after the strip has advanced a distance equal to one-half the spacing between the outer and inner rows of punches, or, for example, one-tenth of an inch, and the punches have shifted rearward the same distance and while the strip and punches are advancing through the same distance and at the same speed, the punches all operating to produce the new rows of perforations designated c in Fig. 19 two of which rows aline with but intervene the perforations b in previously made rows, another row of the perforations c is made midway between adjacent rows of perforations a and b, and a further row of new perforations c is made in advance of all of the previously made rows of perforations. The next following punching operation, which takes place after the strip has advanced and the punches have shifted rearwardly the distance previously stated and while the strip and punches are advancing through the same distance, produces the rows of perforations d in the strip as shown in Fig. 20, some of these new perforations alining with and intervening perforations c in previously made rows while another row of the new perforations are produced between previously made rows of perforations b and c and a further row of new perforations is made in advance of all of the perforations, and the next punching operation, taking place after the strip has advanced and the punches have shifted rearwardly the distance previously stated and while the strip and punches are advancing through the same distance as in the other punching operations, produces the rows of perforations e in the strip as shown in Fig. 21, some of these new perforations alining with and intervening perforations d in previously made rows while another row of the new perforations are made in the space between previously made rows of perforations c and d and a further new row of perforations is made in advance of all of the perforations, a portion of the length of the strip being then completely perforated, both longitudinally and transversely with the perforations equally spaced in both directions thereof.

Figure 22:
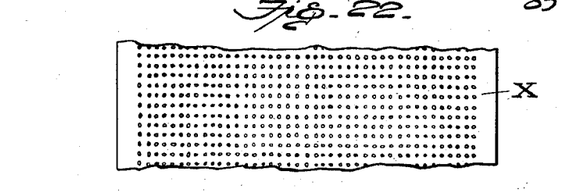
Fig. 22 shows a portion of the length of a completely perforated strip.

By staggering the punches and spacing the rows thereof as hereinbefore described and performing the punching operations in the strip as explained, the perforations in the completely perforated strip will be in rows spaced longitudinally thereof half the distance between the outer and respective inner rows of punches and the transverse rows of perforations will be of a number equal substantially to twice the number of punches in each row or will be spaced one-half the distance between the punches in each row, as will be seen from Fig. 22. The wider spacing apart of the inner rows of punches to the extent of one and one-half times the spacing of the outer rows of punches from the respective inner rows, in conjunction with the feed of the strip and the travel of the punches so that they act on the strip at intervals equal to the spacing apart of the outer rows of punches from the inner rows thereof, as described, enables the punching operations to proceed rapidly along the strip, such unequal spacing between the rows of punches causing the spaces left between the perforations made by some of the rows of punches to be perforated by other punches, and by relatively staggering the punches in the rows as described, the rows of perforations made by some of the rows of punches will be supplied with intervening perforations alining therewith by other rows of punches, and by spacing the punches in the rows thereof and the rows of punches from one another as shown and described, regular and uniform spacing of the perforations in the completely perforated strip, which is generally desirable, is accomplished.

The punches are operated at relatively high speed, this being accomplished conveniently by driving their actuating eccentrics directly from the electric motor or other source of power while the feed rolls and take-up means advance the strip continuously but at a sufficiently low speed, by appropriate gear reduction, to obtain the hereinbefore described close spacing of the perforations in the strip, the machine operating rapidly since the punches operate on the strip while the latter continues to travel, thus avoiding interruptions in the advance of the strip during the punching operations, and moreover, the invention enables this advantage to be obtained while reciprocating punches or perforating pins are employed, reciprocating punches enabling the perforating operation to be performed most effectively, especially upon materials such as "Cellophane". Any variation in the rate of forward travel of the punches as produced by the eccentrics with respect to the normal rate of forward travel of the strip, while the punches are entering the strip and approaching their lowermost position or while they are passing from such lowermost position and are withdrawing from the strip, will be slight and is compensated for by the yield or elasticity of the strip, especially when the strip being perforated is composed of "Cellophane", the engagement of the numerous punches with the strip causing the strip to accommodate itself to the speed of travel of the punches so that tearing of the strip or elongation of the perforations therein is avoided.

In order to avoid or minimize vibration due to the rapid reciprocations of the punches under the action of the eccentrics, the shaft 47 carrying the eccentrics is preferably provided with compensating disks or weights 105 which are fixed thereon and have their weight so distributed by boring or otherwise as to counterbalance the reciprocatory punches.

I claim as my invention:

1. A perforating machine comprising means for feeding a strip of flexible material continuously, take-up means operative to tension and continuously wind the strip as fed by said feeding means, a member mounted to move in the direction of the length of said strip and carrying a reciprocating punch and a cooperative die to act on the portion of the strip extending between said feeding and take-up means, and an eccentric carrying the punch and operative thereon to advance it toward the die to perforate said strip and to retract it therefrom and to move said member in the direction of feed of the strip and in a reverse direction relatively thereto.

2. A perforating machine comprising feed rolls for feeding a strip of flexible material, take-up means spaced beyond the feed rolls for tensioning and continuously winding the strip, means common to said feed rolls and take-up means for operating them to continuously advance the strip; a member movable to and fro in the direction of the length of said strip, a punch and cooperative die mounted on said member to act on the portion of said strip extending between said feed rolls and take-up means, the punch being movable toward and from the die, and an eccentric carrying the punch and operative during its rotation to reciprocate the punch toward and from the die and to move said member to and fro.

3. A perforating machine comprising means for feeding a strip of flexible material continuously, take-up means for tensioning and continuously winding the strip as fed by said feeding means, a member mounted to move in the direction of the length of said strip, punch and die elements carried by said member to act on the portion of the strip extending between said feeding and take-up means, one of said elements being guided to move on said member toward and from the other element thereon, an eccentric for actuating said movable element, and driving means connected to said feeding and take-up means and to said eccentric and operative to advance said movable element toward said other element and to retract it therefrom and to move said elements and member in the direction and at the same speed, of feed of the strip while said movable element is advanced and in a direction opposite to the direction of feed of the strip while said movable element is retracted.

4. A perforating machine comprising means for feeding a strip of material, a pair of arms pivoted to swing to and fro in the direction of the length of said strip and having guides thereon, a die and cooperative stripper plate fixed at their ends to said arms and connecting the latter, said die and stripper plate being in spaced relation to provide a passageway between them for said strip, a punch mounted to reciprocate in said guides on said arms and operative through said stripper plate and upon the portion of the strip between the stripper plate and die, and an actuating member operative on the punch member to reciprocate it and to also swing said arms to and fro.

5. In a perforating machine, a multiple punch comprising a row of punch elements bent intermediately of their ends into yoke shapes, a rod on which said elements are alined and seated at the bends therein, and opposed plates clamping said rod and the bends of the punch elements between them, one of said plates having perforations therein through which the ends of the punch elements project.

6. In a perforating machine, the combination of means for feeding a strip of material, a punching device for perforating the strip, driving means common to said feeding means and punching device for operating the feeding means to feed the strip continuously and to concurrently operate the punching device to perforate the strip, a take-up reel for winding the perforated strip, said reel having circular end flanges, and means for rotating the take-up reel including a shaft driven from said driving means, members on said shaft engaging the peripheries of said flanges for driving the reel, and frictional driving means between said shaft and said reel driving members thereon to compensate for the increasing diameter of the strip wound on the reel.

7. In a perforating machine, the combination of means for feeding a strip of material, a punching device for perforating the strip, driving means common to said feeding means and punching device for operating the feeding means to feed the strip continuously and to concurrently operate the punching device to perforate the strip, a take-up reel for winding the perforated strip, a shaft driven from said driving means, pinions on said shaft geared to the take-up reel, and means for frictionally driving said pinions from said shaft.

8. A perforating machine comprising punching means, and means for feeding a strip of material thereto comprising cooperative feed rolls between which the strip is arranged to pass, one of said rolls being divided in its length into sections, and differential driving means for said sections.

9. A perforating machine comprising punching means, and means for feeding a strip of material thereto comprising cooperative feed rolls between which the strip is arranged to pass, one of said rolls being divided in its length into sections, a driving shaft on which said roll sections are rotatably mounted, and differential gearing connected to said shaft and operative to drive said roll sections.

10. A perforating machine comprising punching means, and means for feeding a strip of material thereto comprising cooperative feed rolls between which the strip is arranged to pass, each of said rolls comprising roll sections, a driving shaft having the sections of one of said rolls fixed thereon, a second drive shaft having the sections of the other roll rotatably mounted thereon, and a differential gearing connecting said second shaft to the roll sections thereon.

11. A perforating machine comprising punching means, rolls for feeding a strip of material thereto and take-up means for winding the perforated strip into a roll, an operating member for the punching means, driving means connected to said operating member, a driving connection between the punch operating member and the feed rolls and take-up device, and a device for disconnecting the feed rolls from said driving connection to permit rotation of the feed rolls independently of said driving connection.

JOHN T. DALTON.